(12) United States Patent
Yamaguchi et al.

(10) Patent No.: US 7,699,544 B2
(45) Date of Patent: Apr. 20, 2010

(54) FOCAL PLANE SHUTTER FOR CAMERAS

(75) Inventors: Yasutaka Yamaguchi, Chiba (JP); Nobuyoshi Inoue, Saitama (JP)

(73) Assignee: Nidec Copal Corporation, Tokyo (JP)

( * ) Notice: Subject to any disclaimer, the term of this patent is extended or adjusted under 35 U.S.C. 154(b) by 254 days.

(21) Appl. No.: 12/068,868

(22) Filed: Feb. 12, 2008

(65) Prior Publication Data
US 2008/0193122 A1 Aug. 14, 2008

(30) Foreign Application Priority Data
Feb. 13, 2007 (JP) ............... 2007-032613

(51) Int. Cl.
*G03B 9/08* (2006.01)
*G03B 9/40* (2006.01)
(52) U.S. Cl. ............... 396/453; 396/454; 396/456; 396/487; 396/488; 396/489
(58) Field of Classification Search ............... 396/453, 396/456
See application file for complete search history.

(56) References Cited

U.S. PATENT DOCUMENTS 7,431,517 B2 * 10/2008 Usuda et al. ............... 396/452
7,614,806 B2 * 11/2009 Pasquarella et al. ......... 396/453
2002/0136555 A1 * 9/2002 Watabe et al. ............... 396/453
2008/0267615 A1 * 10/2008 Nishio ........................ 396/453

FOREIGN PATENT DOCUMENTS

| JP | 09-005831 | * | 1/1997 |
| JP | 2576780 | | 5/1998 |
| JP | 10-161181 | | 6/1998 |
| JP | 2001-133839 | | 5/2001 |

OTHER PUBLICATIONS

Kohei et al., JP 09-005831 teaches a focal plane shutter, Oct. 1, 1997, 7 pages including English Abstract.*

* cited by examiner

*Primary Examiner*—Melissa J Koval
(74) *Attorney, Agent, or Firm*—Wenderoth, Lind & Ponack, L.L.P.

(57) ABSTRACT

A shutter base plate is made of synthetic resin and is configured with one overhang section on the blade-chamber-side surface at one end of an arcuate slot and the other overhang section on the blade-chamber-outside surface. A shock absorbing member made from elastic material is configured with concave portions on the blade-chamber-side surface and three concave portions on the blade-chamber-outside surface. The shock absorbing member is mounted to the shutter base plate in such a way that these concave portions come in contact with the overhang sections, and as is well known, when an exposure operation is completed, the driving pin of a driving member abuts on the shock absorbing member.

5 Claims, 10 Drawing Sheets

FOCAL PLANE SHUTTER FOR CAMERAS

BACKGROUND OF THE INVENTION

1. Field of the Invention

This invention relates to a focal plane shutter for cameras, provided with one or two shutter blades.

2. Description of Related Art

In focal plane shutters for cameras, two types are known: those in which two blade chambers are provided between three plate members, called a shutter base plate, an intermediate plate, and an auxiliary base plate so that two shutter blades, called a first blade and a second blade are separately placed in the two blade chambers, and those in which a single shutter blades is placed in a blade chamber provided between the shutter base plate and the auxiliary base plate. The former focal plane shutters are adopted in digital cameras as well as in silver-halide film cameras, while the latter focal plane shutters are adopted only in digital cameras.

In either case of the focal plane shutters, the structure of the shutter blade is nearly the same and the shutter is constructed with a plurality of arms, one end of each of which is rotatably mounted to the shutter base plate, and at least one blade pivotally supported by the plurality of arms through a connection shank. A driving member is rotatably mounted to the blade-chamber-outside surface of the shutter base plate, and its driving pin is extended from an arcuate slot configured in the shutter base plate into the blade chamber and is connected to one of the arms. Thus, the shutter blade is constructed so that an opening and closing operation is performed by the reciprocating rotation of the driving member.

The driving member is rotated at a high speed in an exposure operation, and hence when the operation is completed, the driving pin is made to abut on a shock absorbing member made from elastic material and attached to one end of the slot and is braked by temporarily compressing the shock absorbing member so that the bound of the driving pin is favorably suppressed and the driving pin is stopped. The shape of such a shock absorbing member and a structure for attaching the member to one end of the slot are set forth in Japanese Patent Kokai No. 2001-133839.

As mentioned above, the shock absorbing member on which the driving pin of the driving member abuts when the exposure operation is completed, as disclosed in Kokai No. 2001-133839, is generally made from elastic material, such as butyl rubber, so as to have a planar shape like the letter "C", and is configured with two arcuate overhang sections of nearly the same shape (flange portions in Kokai No. 2001-133839) at both end of the shutter base plate along its plate thickness on the periphery. The shock absorbing member is compressed and deformed in its entirety and is admitted to the slot. The shock absorbing member is restored to its original shape at one end of the slot in a longitudinal direction, and is mounted in a state where the edge of the slot of the shutter base plate is held between the two overhang sections. Hence, in a state where the shock absorbing member is mounted, the two overhang sections protrude from both surfaces of the shutter base plate.

However, the protrusions of the overhang sections of the shock absorbing member from the surfaces of the shutter base plate cause the possibility that other constituent members mounted to the shutter base plate interfere in the operation. This brings about considerable design constraints. For example, when the overhang sections of the shock absorbing member protrude from the shutter base plate into the blade chamber, the shutter must be designed so that the constituent members of the shutter blade are prevented from colliding with the overhang sections during the operation. In particular, a big problem is that the head of the connection shank used to pivotally support the blade with respect to the arms collides with the overhang sections. Thus, in order to avoid this problem, it is conceivable that the thickness of the shutter base plate is reduced for a portion corresponding to the mounting part of the shock absorbing member (a part held between the two overhang sections) so that the overhang sections of the shock absorbing member do not protrude from the surfaces of the shutter base plate in a mounted state of the shock absorbing member.

However, even in the mounting structure mentioned above, the problem is not completely solved. That is, as is well known, the shutter blade vibrates in a direction perpendicular to a working plane (along the optical axis) during the operation. Thus, in this mounting structure, the head of the connection shank is brought into sliding contact with the shock absorbing member by the vibration of the shutter blade during the operation, and thereby the shock absorbing member is also compressed in the direction of the thickness of the shutter base plate. When such sliding contact is repeated for a long term, the overhang sections of the shock absorbing member cease to be restored to the original shape, partly due to the fact that the overhang sections are thin parts. Consequently, the top of a sliding contact part (an arcuate peripheral edge) is raised to project into the blade chamber, and the operation of the shutter blade is made unstable. Since the head of the connection shank is not to abut on the shock absorbing member as in the driving pin but to come into sliding contact therewith, there are problems that the shock absorbing member is subjected to wear, and a shock absorbing function and strength for mounting are degraded.

SUMMARY OF THE INVENTION

It is, therefore, an object of the present invention to provide a focal plane shutter for cameras that a shock absorbing member which is attached to one end of a slot of a shutter base plate and on which a driving pin of a driving member abuts when an exposure operation is completed can be favorably mounted to the shutter base plate without any design constraint on a shutter unit and that the shock absorbing member is excellent in durability.

In order to achieve the above object, the focal plane shutter for cameras according to the present invention comprises a shutter base plate made of synthetic resin; an auxiliary base plate that at least one blade chamber is constructed together with the shutter base plate between the shutter base plate and the auxiliary base plate; at least one shutter blade including a plurality of arms and at least one blade component pivotally supported by the arms, one end of each of which is rotatably mounted to each of a plurality of blade mounting shanks set upright on the shutter base plate; at least one driving member rotatably mounted to the blade-chamber-outside surface of the shutter base plate and causing the shutter blade to perform an opening and closing operation by a driving pin passing through an arcuate slot configured in the shutter base plate and connected to one of the arms; and a shock absorbing member made from elastic material and mounted to one end of the slot so that the driving pin abuts on the shock absorbing member and thereby the rotation of the driving member is stopped. In this case, the shutter base plate is configured with overhang sections on the blade-chamber-outside surface and the blade-chamber-side surface of the shutter base plate at one end of the slot so that the shock absorbing member is held between the overhang sections and the overhang section configured at least on the blade-chamber-side surface of the shutter base plate is provided within the thickness of the shutter base plate.

In the above description, the shock absorbing member may be designed so that a concave section is configured along a peripheral edge coming in contact with the inner wall of the slot on at least one of the blade-chamber-side surface and the blade-chamber-outside surface of the shock absorbing member and at least one of the overhang sections comes in contact with the shock absorbing member in the concave section. The shock absorbing member may be also designed so that a concave section is configured, at least on the blade-chamber-side surface of the shock absorbing member, along a peripheral edge coming in contact with the inner wall of the slot and the overhang sections come in contact with the concave section and the blade-chamber-outside surface of the shock absorbing member to hold a part of the shock absorbing member between the overhang sections. It may be further designed so that at least one of the overhang sections is divided into a plurality of overhang portions along one end of the slot. In the last case mentioned above, the shock absorbing member may be constructed so that a plurality of concave portions divided along the peripheral edge coming in contact with the inner wall of the slot are configured on at least one of the blade-chamber-side surface and the blade-chamber-outside surface of the shock absorbing member and the overhang section divided into the plurality of overhang portions comes in contact with the shock absorbing member in the plurality of concave portions.

In the present invention, the focal plane shutter for cameras is constructed so that when the exposure operation is completed, the driving pin of the driving member abuts on the shock absorbing member mounted to one end of the slot of the shutter base plate. The shutter base plate is configured with the overhang sections on the blade-chamber-side surface and the blade-chamber-outside surface of the shutter base plate, along one end of the slot in a longitudinal direction so that the overhang section at least on the blade-chamber-side surface of the shutter base plate is configured to lie within the thickness of the shutter base plate and the shock absorbing member is held between the overhang sections on the blade-chamber-side surface and the blade-chamber-outside surface of the shutter base plate. Hence, the number of degrees of design freedom of constituent members, notably of the shutter blade, in the shutter unit is increased, and the durability of the shock absorbing member is excellent.

This and other objects as well as features and advantages of the present invention will become apparent from the following detailed description of the preferred embodiments when taken in conjunction with the accompanying drawings.

DETAILED DESCRIPTION OF THE PREFERRED EMBODIMENTS

Figure 1:
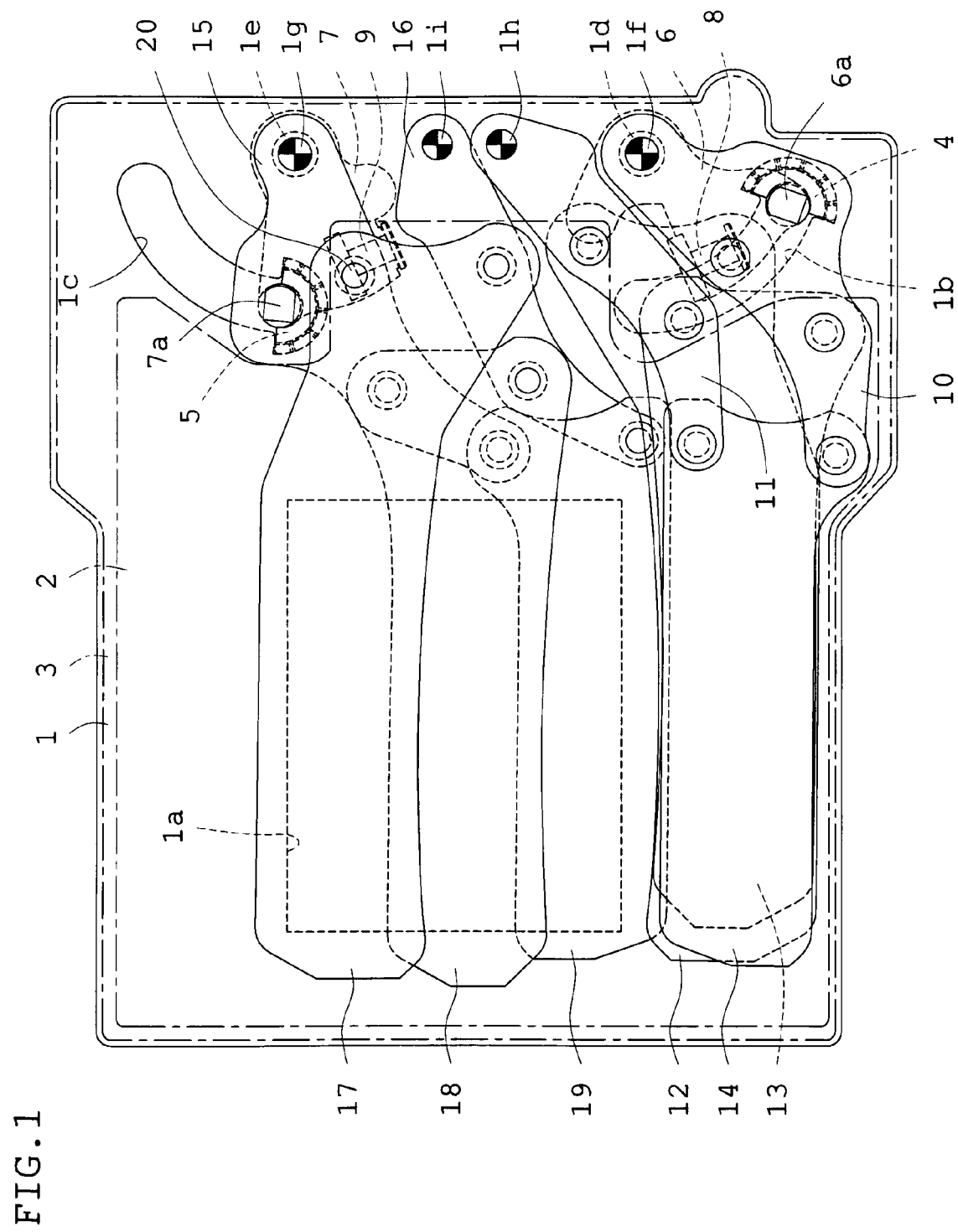
FIG. 1 is a plan view showing a state brought about immediately after the exposure operation is completed in Embodiment 1, viewed from a solid-state image sensor side.

In accordance with three embodiments shown in the drawings, aspects of the present invention will be explained. As mentioned above, the present invention can be constructed as a focal plane shutter provided with a single shutter blade as well as with two shutter blades. Embodiment 1 is constructed as the focal plane shutter provided with two shutter blades. The focal plane shutter provided with two shutter blades, as already described above, can be adopted in the digital camera as well as in the silver-halide film camera. Embodiment 1 will be explained on the premise that the focal plane shutter provided with two shutter blades is adopted in the digital camera. Embodiments 2 and 3 will be explained with respect to essential parts only.

Embodiment 1

Figure 2:
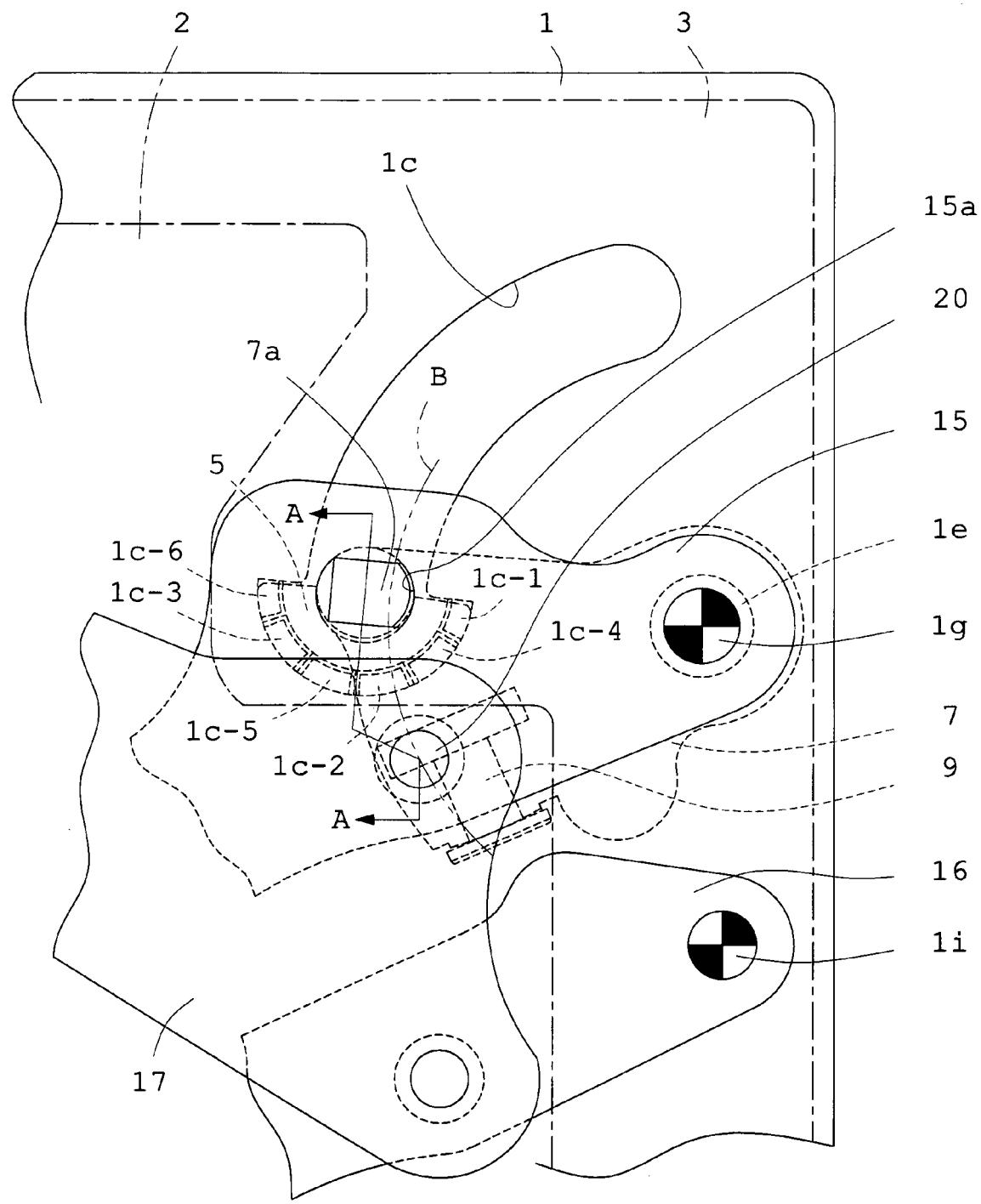
FIG. 2 is a partially enlarged view of FIG. 1.
Figure 3:
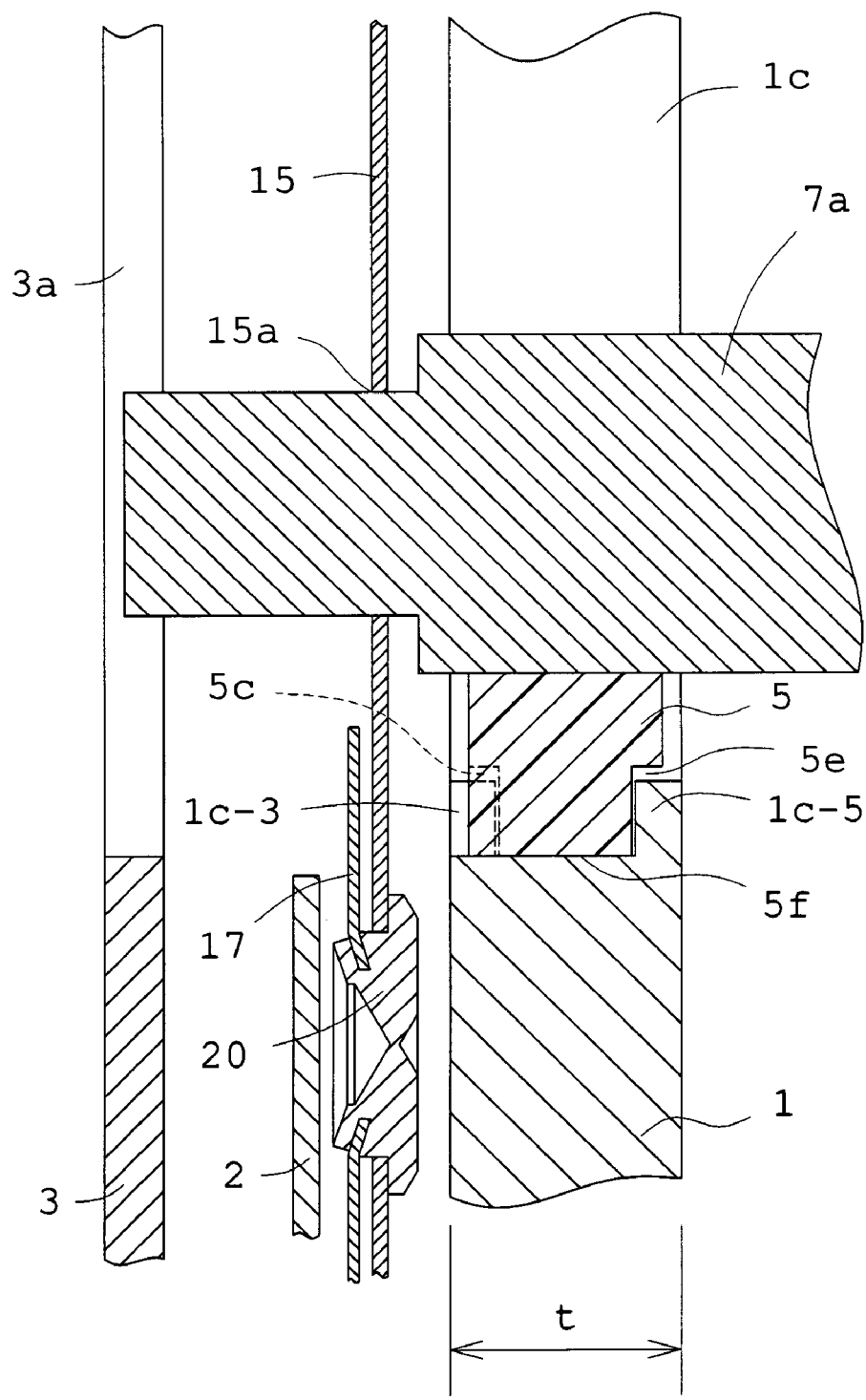
FIG. 3 is a sectional view taken along line A-A in FIG. 2.
Figure 4:
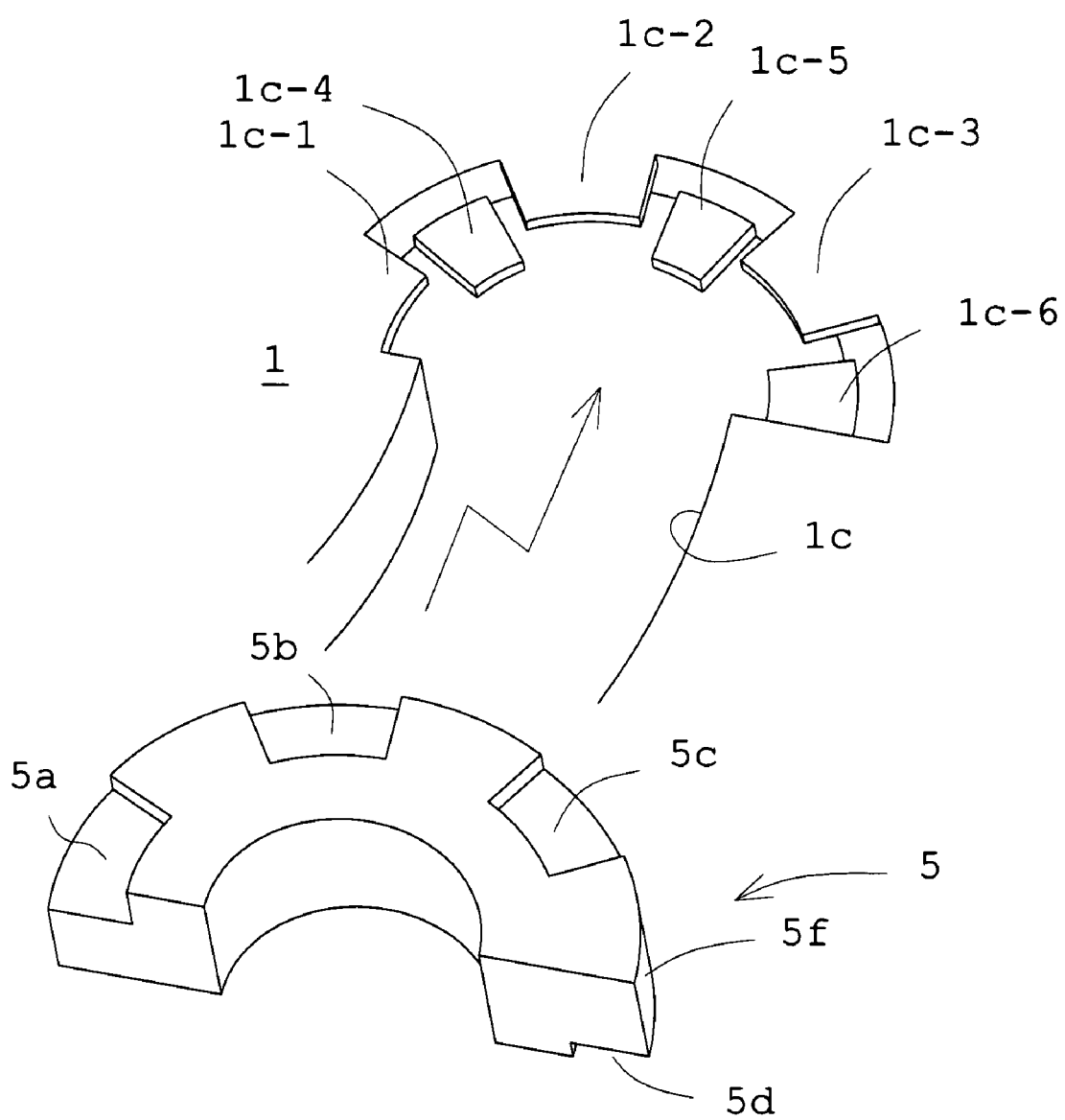
FIG. 4 is a perspective view for explaining a way of mounting the shock absorbing member in Embodiment 1.
Figure 5:
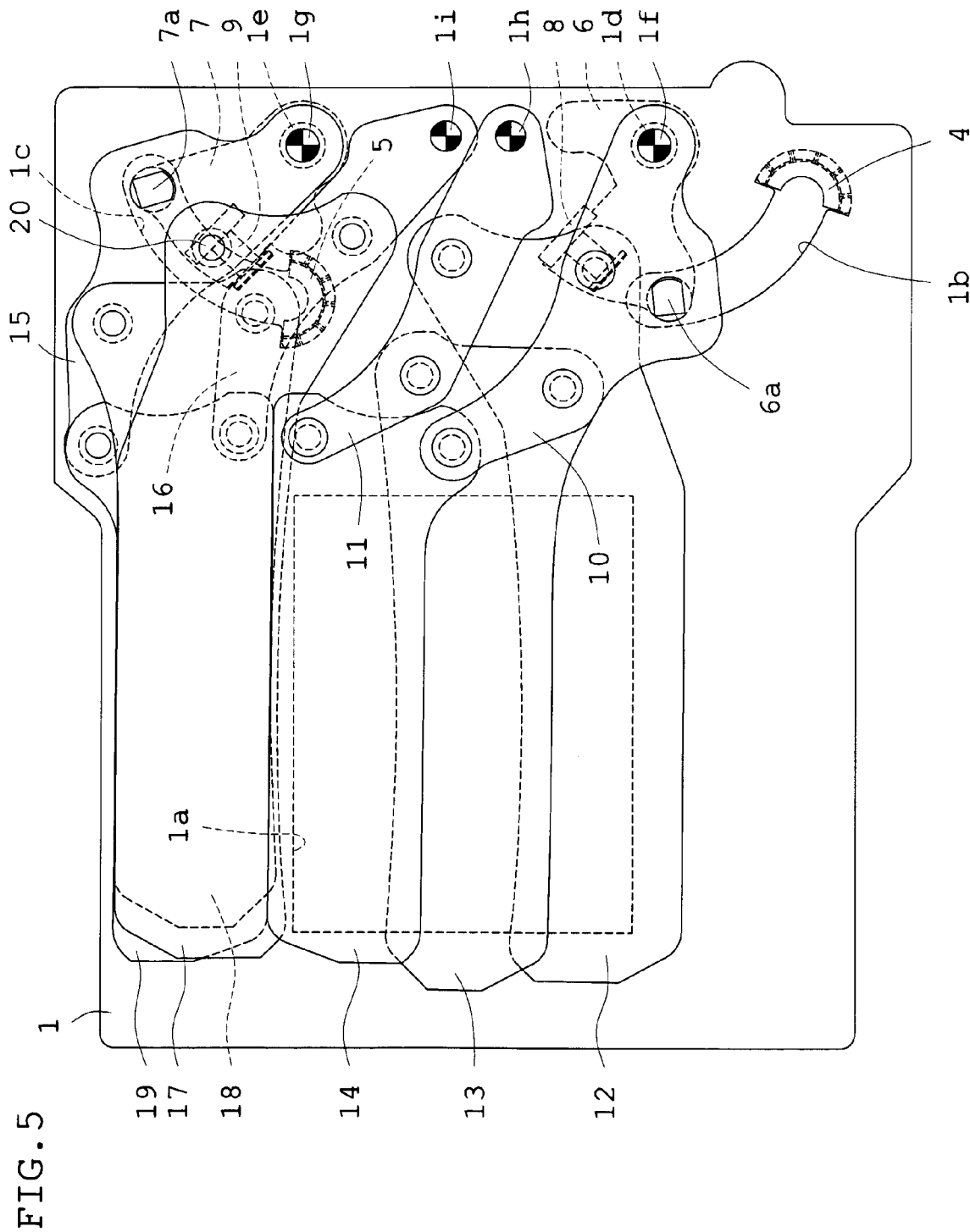
FIG. 5 is a plan view showing a set state of Embodiment 1 as in FIG. 1.
Figure 6:
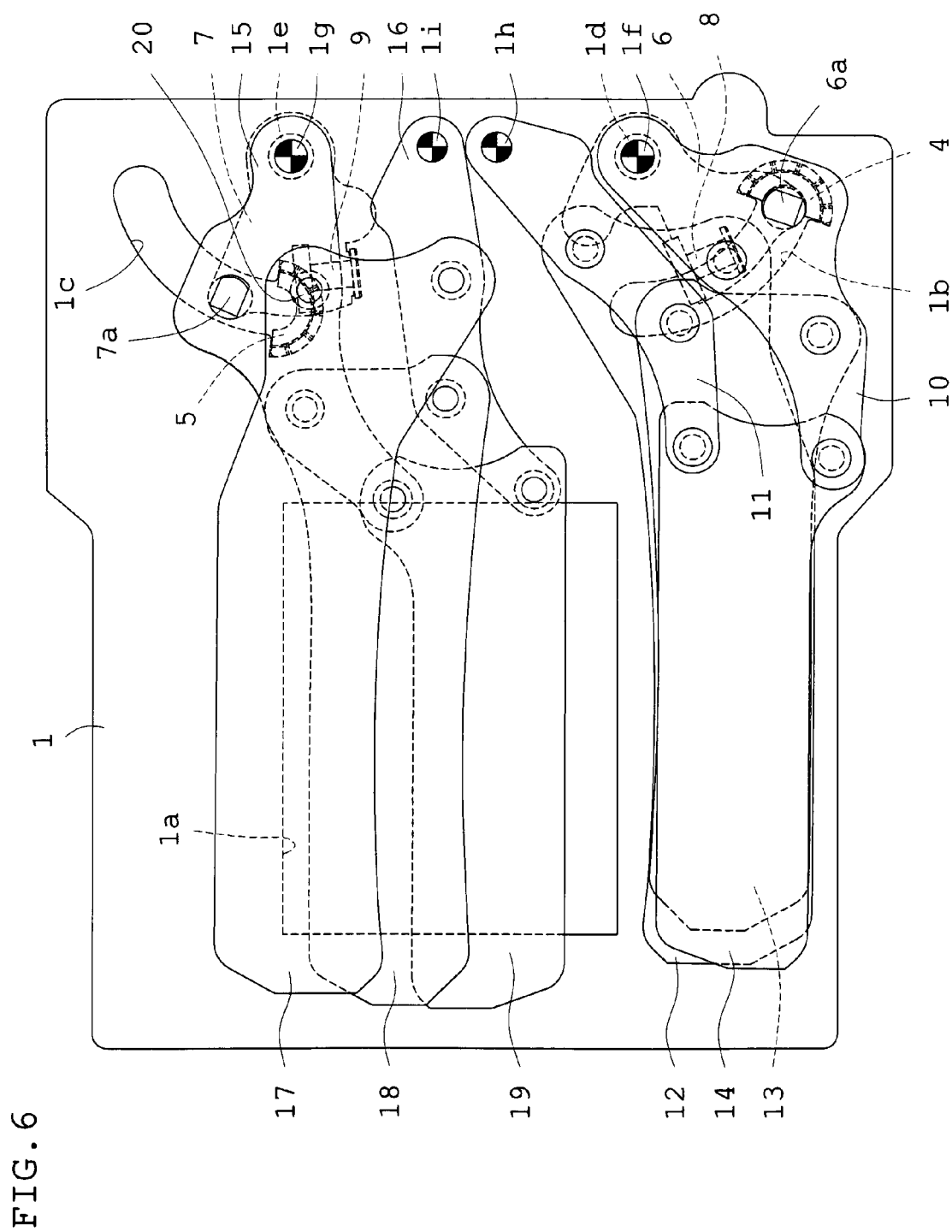
FIG. 6 is a plan view showing an intermediate state of the exposure operation in Embodiment 1 as in FIG. 1.

Using FIGS. 1-6, a description is given of Embodiment 1. FIG. 1 is a plan view showing a state brought about immediately after the exposure operation is completed, viewed from the solid-state image sensor side, and FIG. 2 is a partially enlarged view of FIG. 1. FIG. 3 is a sectional view taken along line A-A in FIG. 2, and FIG. 4 is a perspective view for explaining a way of mounting the shock absorbing member. FIG. 5 is a plan view showing a set state as in FIG. 1, and FIG. 6 is a plan view showing an intermediate state of the exposure operation as in FIG. 1. Thus, the structure of this embodiment will first be explained, chiefly using FIGS. 1-4.

A shutter base plate 1 is made of synthetic resin and has an aperture 1a for a photographing optical path of a rectangle provided in a lateral direction at about its middle. An intermediate plate 2 and an auxiliary base plate 3 are mounted in turn at a preset distance apart by a proper means on the solid-state image sensor side of the shutter base plate 1, namely, on the front side of the plane of the page in FIG. 1, so that the blade chamber of a second blade is constructed between the shutter base plate 1 and the intermediate plate 2, while the blade chamber of a first blade is constructed between the intermediate plate 2 and the auxiliary base plate 3. However, the intermediate plate 2 and the auxiliary base plate 3 are well known, and therefore, to facilitate a comprehension of the figures, only the contours of these plates are indicated by chain lines in FIGS. 1 and 2, and the plates are omitted from FIGS. 5 and 6, but are indicated by solid lines in FIG. 3.

The intermediate plate 2 and the auxiliary base plate 3 are also configured with apertures that are larger than the aperture 1a and have similar shapes, opposite to the aperture 1a, but in FIG. 1, these apertures are omitted. In FIG. 1, the shutter base plate 1 has two nearly arcuate, large slots 1b and 1c in the right-side region of the aperture 1a. In the auxiliary base plate 3 as well, slots similar in shape to the slots 1b and 1c are configured opposite to the slots 1b and 1c, but in FIG. 1, these slots are omitted, and only a slot 3a configured opposite to the slot 1c is shown in FIG. 3.

In FIG. 1, shock absorbing members 4 and 5, each having a planar shape like the letter "C", are mounted at lower ends of the slots 1b and 1c of the shutter base plate 1. In the case of this embodiment, the shock absorbing members 4 and 5 have unique shapes and mounting structures. However, both the mounting structures are substantially the same. As such, in the following description, only the mounting structure of the shock absorbing member 5 is explained, chiefly using FIGS. 3 and 4. Also, each of the shock absorbing members 4 and 5 is made of butyl rubber, but may be fabricated with another material, such as elastomer, if preset elasticity is obtained.

As described above, FIG. 3 shows a section taken along line A-A in FIG. 2. FIG. 4 illustrates a state brought about immediately before the shock absorbing member 5 is mounted. FIG. 4 also shows the shock absorbing member 5 and the end of the slot 1c to be mounted with the shock absorbing member 5, obliquely viewed from the upper side toward the lower side on the left side of FIG. 3 (that is, on the blade chamber side). As seen from FIG. 4, at one end of the slot 1c in a longitudinal direction, three overhang portions 1c-1, 1c-2, and 1c-3 are configured on the blade-chamber-side surface of the shutter base plate 1 along the arcuate edge, while three overhang portions 1c-4, 1c-S, and 1c-6 are configured on the blade-chamber-outside surface of the shutter base plate 1 so that the overhang portions on both sides are alternately arranged. In the case of the embodiment, as seen from FIG. 3, the overhang portions on either side are configured to lie within a thickness t of the shutter base plate 1 and do not protrude at all from both surfaces of the shutter base plate 1.

On the other hand, the shock absorbing member 5 of the embodiment, as mentioned above, has the planar shape like the letter "C", and is configured with concave portions by which the thickness is partially reduced, three for each surface, along the arcuate peripheral edge coming in contact with the inner wall of the slot 1c. As seen from FIG. 4, concave portions 5a, 5b, and 5c are configured on the blade-chamber-side surface of the shock absorbing member 5. Three concave portions are also configured on the blade-chamber-outside surface of the shock absorbing member 5. In FIG. 4, only a concave portion 5d which is one of these concave portions and is configured into the same shape as the concave portion 5a is shown, but remaining two concave portions, not shown, have the same shape as the concave portions 5b and 5c. These three concave portions configured on the blade-chamber-outside surface of the shock absorbing member 5 are arranged to alternate with the three concave portions 5a, 5b, and 5c configured on the blade-chamber-side surface of the shock absorbing member 5. Moreover, when the shock absorbing member 5 is mounted to the slot 1c, an arcuate peripheral surface 5f is taken as an abutment surface.

In order to mount the shock absorbing member 5 shaped as describe above to one end of the slot 1c, the shock absorbing member 5 is compressed and deformed so that a linear distance between both ends of the peripheral surface 5f is reduced, and as indicated by an arrow in FIG. 4, the shock absorbing member 5, after being advanced into the slot 1c, is moved toward the end so that it is inserted between the overhang portions 1c-1~1c-3 and the overhang portions 1c-4~1c-6 and is restored to the original shape at the stage that the peripheral surface 5f abuts on the inner wall of the slot 1c. Consequently, in its mounted state, the overhang portions 1c-1~1c-3 come in contact with the concave portions 5a-5c, respectively, while the overhang portions 1c-4~1c-6 come in contact with the three concave portions containing the concave portion 5d. Thus, in FIG. 3, a concave portion configured on the blade-chamber-outside surface of the shock absorbing member 5 and coming in contact with the overhang portion 1c-5 is labeled as 5e.

In the embodiment, the concave portions of the shock absorbing member 5, three for each surface, are provided for the purpose that the mounting position of the shock absorbing member 5 can be favorably stabilized. Hence, such concave portions may be necessary for one surface alone or may be unnecessary for both surfaces. In the embodiment, the reason that the overhang portions 1c-i~1c-3 and the overhang portions 1c-4~1c-6 are alternately configured is because the molding and fabrication of the shutter base plate 1 is facilitated. Thus, when there is no need to consider these, the overhang sections provided on one or both surfaces may be configured into continuous arcuate shapes without being divided into the plurality of overhang portions as in the embodiment.

When the overhang section is configured into the arcuate shape, the plurality of concave portions provided on each surface of the shock absorbing member 5 may be configured as one continuous arcuate concave portion. Hence, such an arcuate concave portion may be configured on each surface of the shock absorbing member 5 or may be configured on one surface alone so that a flat portion is configured on the other surface.

Of these aspects, Embodiment 2 to be described later gives a case where each of the overhang sections on the blade-chamber-side surface and the blade-chamber-outside surface of the shutter base plate 1 is configured into one arcuate shape, and is a modified example where the arcuate concave portion is provided on one surface alone of the shock absorbing member, while the flat portion is provided on the other surface. Embodiment 3 gives a case where each of the overhang sections on the blade-chamber-side surface and the blade-chamber-outside surface of the shutter base plate 1 is configured as one arcuate overhang section, and is a modified example where the arcuate concave portion is provided on each surface of the shock absorbing member 5.

In FIG. 1, shanks 1d and 1e are set upright on the back surface of the shutter base plate 1, namely, on the blade-chamber-outside surface of the shutter base plate 1, and a first blade driving member 6 and a second blade driving member 7 are rotatably mounted to the shanks 1d and 1e, respectively, and are biased so that they are rotated counterclockwise by well-known driving springs, not shown. The first blade driving member 6 and the second blade driving member 7 have driving pins 6a and 7a, which are inserted in the slots 1b and 1c to pass through the blade chamber. The driving pins 6a and 7a are such that roots abutting on the shock absorbing members 4 and 5 have a circular cross section and tops have a D-shaped cross section. The first blade driving member 6 and the second blade driving member 7 are mounted with well-known iron pieces 8 and 9, for example, as set forth in Japanese Patent Kokai No. 2005-241871.

Also, in addition to this, on the blade-chamber-outside surface of the shutter base plate 1, set members rotating the first blade driving member 6 and the second blade driving member 7 clockwise against the biasing forces of the driving springs to set positions and a first blade electromagnet and a second blade electromagnet attracting and holding the iron piece members 8 and 9 at an initial release stage are mounted directly or indirectly. However, their structures, which are well known, have no direct relation to the present invention, and thus are omitted from the figures.

On the blade-chamber-side surface of the shutter base plate 1, shanks 1f and 1g are set upright so as to be in alignment with the shanks 1d and 1e, respectively, and in addition, shanks 1h and 1i are set upright. As mentioned above, the second blade is placed in the blade chamber provided between the shutter base plate 1 and the intermediate plate 2, while the first blade is placed in the blade chamber provided between the intermediate plate 2 and the auxiliary base plate 3. The first blade includes two arms 10 and 11 and three blade components 12, 13, and 14 pivotally supported in turn in their longitudinal direction. The arms 10 and 11 are arranged on the auxiliary-base-plate-3 side of the blade components 12, 13, and 14 and their ends, one for each arm, are rotatably mounted to the shanks 1$f$ and 1$h$. Although it is hard to understand from FIG. 1, the arm 10 is configured with a slot so that the top portion of the driving pin 6$a$ of the first blade driving member 6 is fitted into the slot and is inserted in a slot, not shown, provided in the auxiliary base plate 3.

On the other hand, the second blade includes two arms 15 and 16 and three blade components 17, 18, and 19 pivotally supported in turn in their longitudinal direction and is placed in a state where the first blade is reversed in the blade chamber. Thus, the arms 15 and 16 are arranged on the shutter-base-plate-1 side of the blade components 17, 18, and 19 and their ends, one for each arm, are rotatably mounted to the shanks 1$g$ and 1$i$. Although not labeled in FIG. 1 because it is hard to understand, the arm 15, as seen from FIG. 2, is configured with a slot 15$a$ so that the top portion of the driving pin 7$a$ of the second blade driving member 7 is fitted into the slot 15$a$ and is inserted in the slot 3$a$ of the auxiliary base plate 3.

In each of the first and second blades, as mentioned above, the three blade components are pivotally supported by the two arms, but pivotal supporting structures at six places, namely, at 12 places in total, are all the same and are well-known structures in which connection shanks are used. That is, in FIG. 3, the pivotal supporting structure of the blade component 17 relative to the arm 15 is specifically shown. In this case, after a connection shank 20 that is a rivet member is inserted in holes provided in the arm 15 and the blade component 17 in turn, its top is fixed to the blade component 17 by caulking and thereby the arm 15 and the connection shank 20 can be mutually rotated. Consequently, in FIG. 1, six connection shanks used for the first blade are such that their heads protrude from the arms 10 and 11 on the auxiliary-base-plate-3 side, while six connection shanks, containing the connection shank 20, used for the second blade are such that their heads protrude from the arms 15 and 16 on the shutter-base-plate-1 side.

Subsequently, reference is made to the operation of the embodiment. FIG. 1 illustrates a state where the exposure operation is completed, the three blade components 12-14 of the first blade are made to overlap and are stored at the lower position of the aperture 1$a$, and the three blade components 17-19 of the second blade are spread to cover the aperture 1$a$. In this state, imaging information is transferred from a solid-state image sensor to a memory device. When this transfer is completed, the set operation is immediately performed. In this case, the set member, not shown, is rotated from the initial position by a member provided on the camera body side, and first starts to rotate the first blade driving member 6 in a clockwise direction against the biasing force of a first blade driving spring, not shown. After that, when the slit-forming blade component 14 of the first blade overlaps the slit-forming blade component 19 of the second blade by a preset amount, the set member starts to rotate the second blade driving member 7 in the clockwise direction against the biasing force of a second blade driving spring, not shown. As a result, the three blade components 12-14 of the first blade are moved upward while reducing overlapping of the blade components, whereas the three blade components 17-19 of the second blade are moved downward while increasing overlapping of the blade components.

The set operation is performed in this way and reaches a state where the three blade components 12-14 of the first blade are spread to cover the aperture 1$a$ and the three blade components 17-19 of the second blade are made to overlap and are stored at the upper position of the aperture 1$a$. At this time, the iron piece members 8 and 9 mounted to the driving members 6 and 7 are brought into contact with core members of the first blade electromagnet and the second blade electromagnet, both not shown. When this state is reached, the rotation of the set member, not shown, is stopped and a set state shown in FIG. 5 is established so that a wait state continues until the next photography.

Each of the shock absorbing members 4 and 5 of the embodiment, like the shock absorbing member 5 shown in FIG. 3, do not protrude from both surfaces of the shutter base plate 1. In addition, the plurality of overhang portions configured at one end of each of the slots 1$b$ and 1$c$ of the shutter base plate 1 in order to mount each of the shock absorbing embers 4 and 5, as seen from the overhang portions 1$c$-3 and 1$c$-5 in FIG. 3, do not also protrude from both surfaces of the shutter base plate 1. Hence, when the shutter base plate 1 is shaped as in the embodiment, there are advantages of facilitating the manufacture of a metallic mold and designs of various members arranged and actuated on both surfaces of the shutter base plate 1. However, the present invention is not limited to the shutter constructed so that the shock absorbing members 4 and 5 and the plurality of overhang portions for mounting the shock absorbing members 4 and 5 do not protrude from both surfaces of the shutter base plate 1. The shutter is designed so that the shock absorbing members 4 and 5 and the plurality of overhang portions for mounting them do not protrude at least from the blade-chamber-side surface of the shutter base plate 1, and thereby very great advantages are obtained.

Specifically, in the embodiment, the shock absorbing member 5 is placed along the track of actuation of the connection shank 20, and thus if the shock absorbing member 5 and the overhang portions 1$c$-1~1$c$-3 protrude from the blade-chamber-side surface of the shutter base plate 1, the head of the connection shank 20 will collide with them. Thus, in order to avoid this problem, it is necessary to configure the shutter base plate 1 into a special shape or shift the pivotal supporting position. If an attempt is made to do so, however, in the former case, the thickness of the shutter base plate 1 in the region close to each of the slots 1$b$ and 1$c$ must be made larger than is necessary, while in the latter case, the plane area of the shutter base plate 1 must be increased. In contrast to this, the embodiment is not entirely required to do so.

In the mounting structure of the shock absorbing member such as that described in Kokai No. 2001-133839, there is also the consideration that it is only necessary to construct the shock absorbing member so that it is made small in thickness and do not protrude from the blade-chamber-side surface of the shutter base plate. In order to do so, however, even though the part of the shutter base plate for mounting the shock absorbing member is made thin, two overhang sections on the shock absorbing member side for holding the part between them (the flange portions in Kokai No. 2001-133839) must be made considerably thin. As a result, it becomes difficult to obtain a preset strength for mounting. Even though the shutter is constructed as mentioned above, nothing is pressed so that the two overhang sections (the flanges) do not protrude from both surfaces of the shutter base plate. Moreover, since the head of the connection shank 20 comes in sliding contact with the shock absorbing member each time the set operation is performed, wear and deformation occur in long-term use and arcuate peripheries of the overhang sections are turned over to protrude from the blade-chamber-side surface of the shutter base plate. In contrast to this, in the embodiment, the overhang portion 1c-2 lying on the track of the head of the connection shank 20 (a two-dot chain line B in FIG. 2) is configured as a wall so that the head of the connection shank 20 does not come in sliding contact with the shock absorbing member 5. However, even though the contact is rarely made, no problem arises because of instantaneous contact in an extremely narrow region.

When the set state of FIG. 5 is reached in this way and then a release button is pushed for photography, the first blade electromagnet and the second blade electromagnet, both not shown, are first energized, and hence the iron piece members 8 and 9 are attracted to the core members of individual electromagnets and are held. After that, the set member, not shown, starts the operation of restoration to the initial position. At this time, since the iron piece members 8 and 9 are already attracted to the core members of individual electromagnets and are held, the driving members 6 and 7, although only slightly moved as is well known, practically maintain a state in FIG. 5. When the set member is restored to the initial position and is stopped, power to the two electromagnets is disconnected in turn at a time interval determined by an exposure control circuit.

When power to the first blade electromagnet is first disconnected, an attractive force holding the iron piece member 8 is lost and thus the first blade driving member 6 is rapidly rotated in the counterclockwise direction by the biasing force of the first blade driving spring, not shown. Consequently, in the first blade, the exposure operation is performed by the driving pin 6a and the three blade components 12-14 are moved downward while increasing overlapping of the blade components to open the aperture 1a from above. Next, when power to the second blade electromagnet is disconnected, the attractive force holding the iron piece member 9 is lost and thus the second blade driving member 7 is rapidly rotated in the counterclockwise direction by the biasing force of the second blade driving spring, not shown. Consequently, in the second blade, the exposure operation is performed by the driving pin 7a and the three blade components 17-19 are moved downward while reducing overlapping of the blade components to close the aperture 1a from above. After that, therefore, the imaging surface of the solid-state image sensor is exposure in turn through a slit formed between the blade component 14 of the first blade and the blade component 19 of the second blade.

After that, when the blade component 14 of the first blade is completely removed from the aperture 1a, the driving pin 6a of the first blade driving member 6 abuts on the shock absorbing member 4 and thereby the actuations of the first blade driving member 6 and the first blade are stopped. The driving pin 6a, when abutting on the shock absorbing member 4, is braked by temporarily compressing the shock absorbing member 4 and is prevented from bounding. FIG. 6 illustrates a state where the actuations of the first blade driving member 6 and the first blade are stopped in this way, but the second blade driving member 7 and the second blade are still actuated. At this time, the connection shank 20 of the second blade is passing the placement position of the shock absorbing member 5, but as described in the explanation of the set operation, the head of the connection shank 20 (indicated by a circular broken line) comes in little sliding contact with the shock absorbing ember 5. After that, when the blade component 19 of the second blade finishes covering of the aperture 1a, the driving pin 7a of the second blade driving member 7 immediately abuts on the shock absorbing member 5 and is braked by temporarily compressing the shock absorbing member 5 so that it is prevented from bounding and is stopped. A state in this case is shown in FIG. 1, and in this state, the imaging information is transferred from the solid-state image sensor to the memory device.

Also, in the above description, reference has been made to the case where the focal plane shutter of the embodiment is adopted in the digital camera, but it is needless to say that it can also be adopted in the silver-halide film camera. When the focal plane shutter is adopted in the digital camera, the shutter base plate 1 is may be placed not on the object side, but on the solid-state image sensor side as in the embodiment. In addition, if the first blade driving member 6, the first blade, and the first blade electromagnet in the embodiment are not provided, a focal plane shutter for digital cameras, provided with a single shutter blade will be constructed. Such shutters come into the category of the present invention. Although the driving members 6 and 7 in the embodiment are rotated by the biasing forces of the driving springs when the exposure operation is performed, it is also known in recent years that the driving members are reciprocated and rotated by electromagnetic actuators without using the electromagnets and driving springs mentioned above. The present invention is also applied to such constructions.

Embodiment 2

Figure 7:
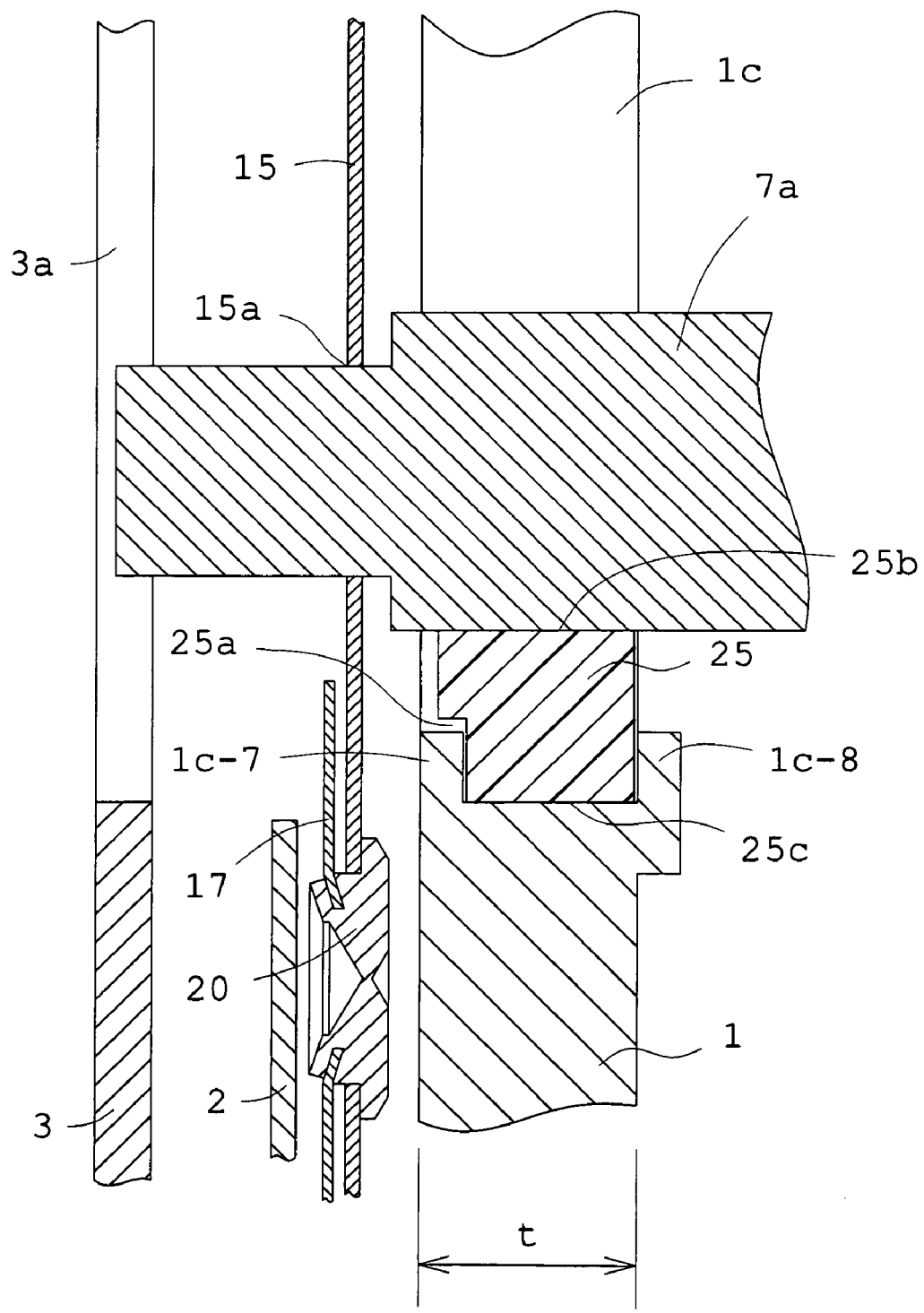
FIG. 7 is a sectional view showing a mounted state of the shock absorbing member of Embodiment 2 as in FIG. 3.
Figure 8:
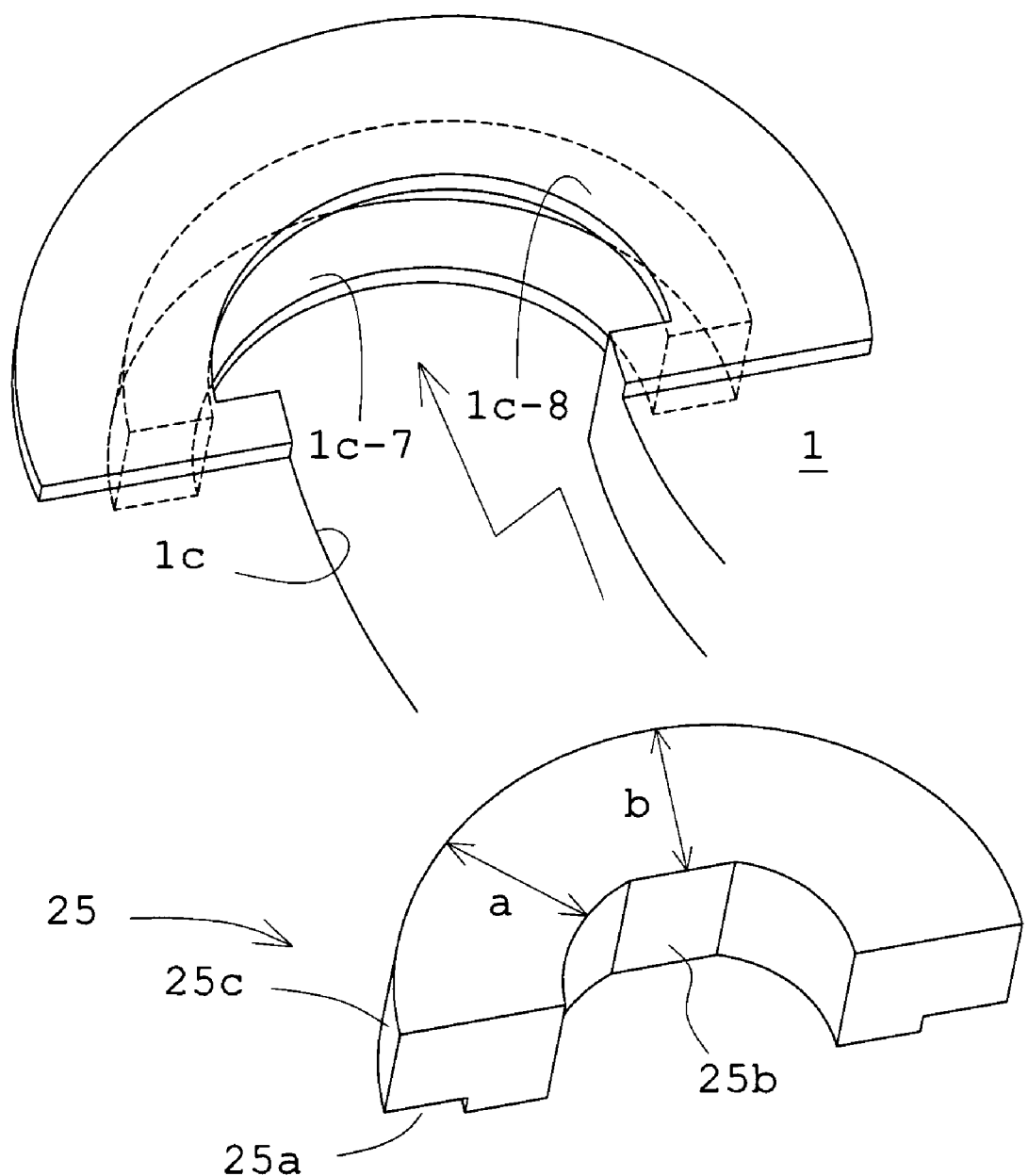
FIG. 8 is a perspective view for explaining a way of mounting the shock absorbing member of Embodiment 2.

Subsequently, Embodiment 2 will be explained, using FIGS. 7 and 8. FIG. 7 is a sectional view showing a mounted state of the shock absorbing member of the embodiment as in FIG. 3, and FIG. 8 is a perspective view for explaining a way of mounting the shock absorbing member of the embodiment, viewed from the upper right of FIG. 7. The shock absorbing members of the embodiment are different in shape from the shock absorbing members 4 and 5 of Embodiment 1. Thus, the shapes of parts configured in the shutter base plate 1 in order to mount the shock absorbing members are also different. However, other features are the same as in Embodiment 1. Hence, in FIGS. 7 and 8, like numerals are used for like members and parts with respect to Embodiment 1 and their explanation is omitted. The description of the operation, which is the same as in Embodiment 1, is also omitted.

As mentioned above, in the embodiment, the shapes of the two shock absorbing members and the structure for mounting them to the shutter base plate 1 are only different from the case of Embodiment 1. The two shock absorbing members are mounted to the shutter base plate 1 in the same way. As such, in FIGS. 7 and 8, only a shock absorbing member 25 on which the driving pin 7a of the second driving member 7 abuts and its mounting structure are shown.

As seen from FIGS. 7 and 8, at one end of the slot 1c provided in the shutter base plate 1 in its longitudinal direction, an overhang portion 1c-7 is configured on the blade-chamber-side surface of the shutter base plate 1 along its arcuate edge and an overhang portion 1c-8 is configured on the blade-chamber-outside surface. In this way, the overhang portions 1c-7 and 1c-8 are not divided unlike the case of Embodiment 1 so that each of them is configured as one arcuate overhang portion. The overhang portion 1c-7 does not protrude from the blade-chamber-side surface of the shutter base plate 1 into the blade chamber. In the embodiment, however, the overhang portion 1c-8 is configured to protrude from the blade-chamber-outside surface of the shutter base plate 1. This is because in the embodiment the protrusion of the overhang portion 1c-8 from the blade-chamber-outside surface of the shutter base plate 1 does not affect the design of constituent members mounted to the shutter base plate 1 on the opposite side.

The shock absorbing member 25 of the embodiment also has a planar shape like the letter "C", but is configured so that a surface 25b on which the driving pin 7a first abuts is a plane perpendicular to the direction of travel of the driving pin 7a. When this plane surface 25b is provided, a depth dimension b of a part most compressed by the driving pin 7a becomes larger than a depth dimension a of the arcuate surface, and braking and shock absorbing effects are increased accordingly. The blade-chamber-outside surface of the shock absorbing member 25 is flat. On the blade-chamber-side surface, however, an arcuate concave portion 25a is configured in a region in which it comes in contact with the overhang portion 1c-7. Consequently, the shock absorbing member 25 is such that an arcuate part held between the overhang portions 1c-7 and 1c-8 is configured into small thickness. The shock absorbing member 25 is deformed as in Embodiment 1 and is inserted between the overhang portions 1c-7 and 1c-8. After a peripheral surface 25c of the shock absorbing member 25 abuts on the inner wall of the slot 1c, the shock absorbing member 25 is restored to the original shape and reaches a mounted state. This mounted state is shown in FIG. 7, and at this time, the shock absorbing member 25 does not protrude from both surfaces of the shutter base plate 1. However, the shock absorbing member 25 is larger in thickness than the shock absorbing member 5 of Embodiment 1 and therefore, regarded from this point of view, the braking and shock absorbing effects are increased. Also, although the shock absorbing member 25 is configured with the plane surface 25b, it need not necessarily be provided with the plane surface 25b as in the shock absorbing member 5 of Embodiment 1. The shock absorbing member 5 of Embodiment 1 may be configured with a plane surface corresponding to the plane surface 25b.

Embodiment 3

Figure 9:
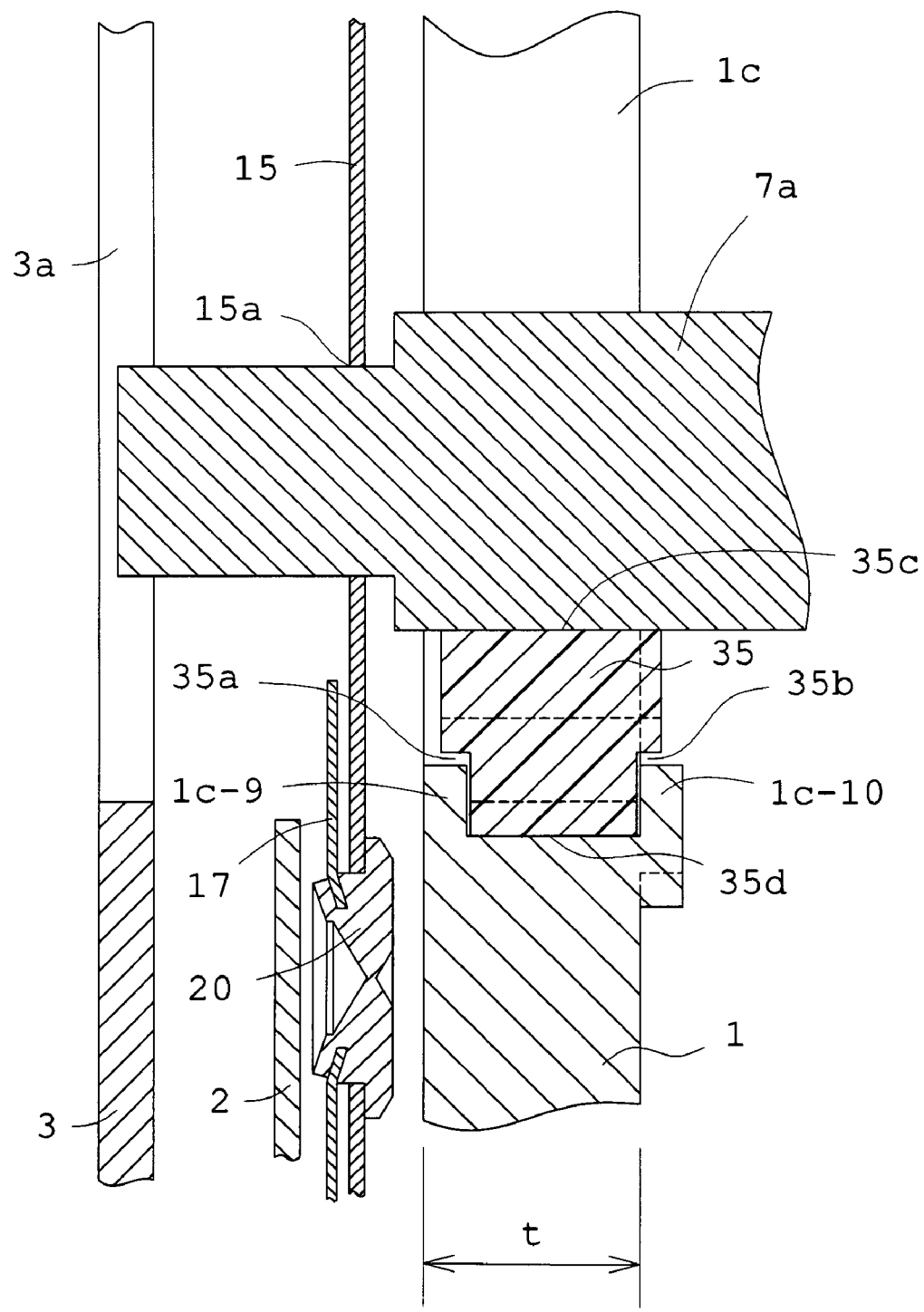
FIG. 9 is a sectional view showing a mounted state of the shock absorbing member of Embodiment 3 as in FIGS. 3 and 7.
Figure 10:
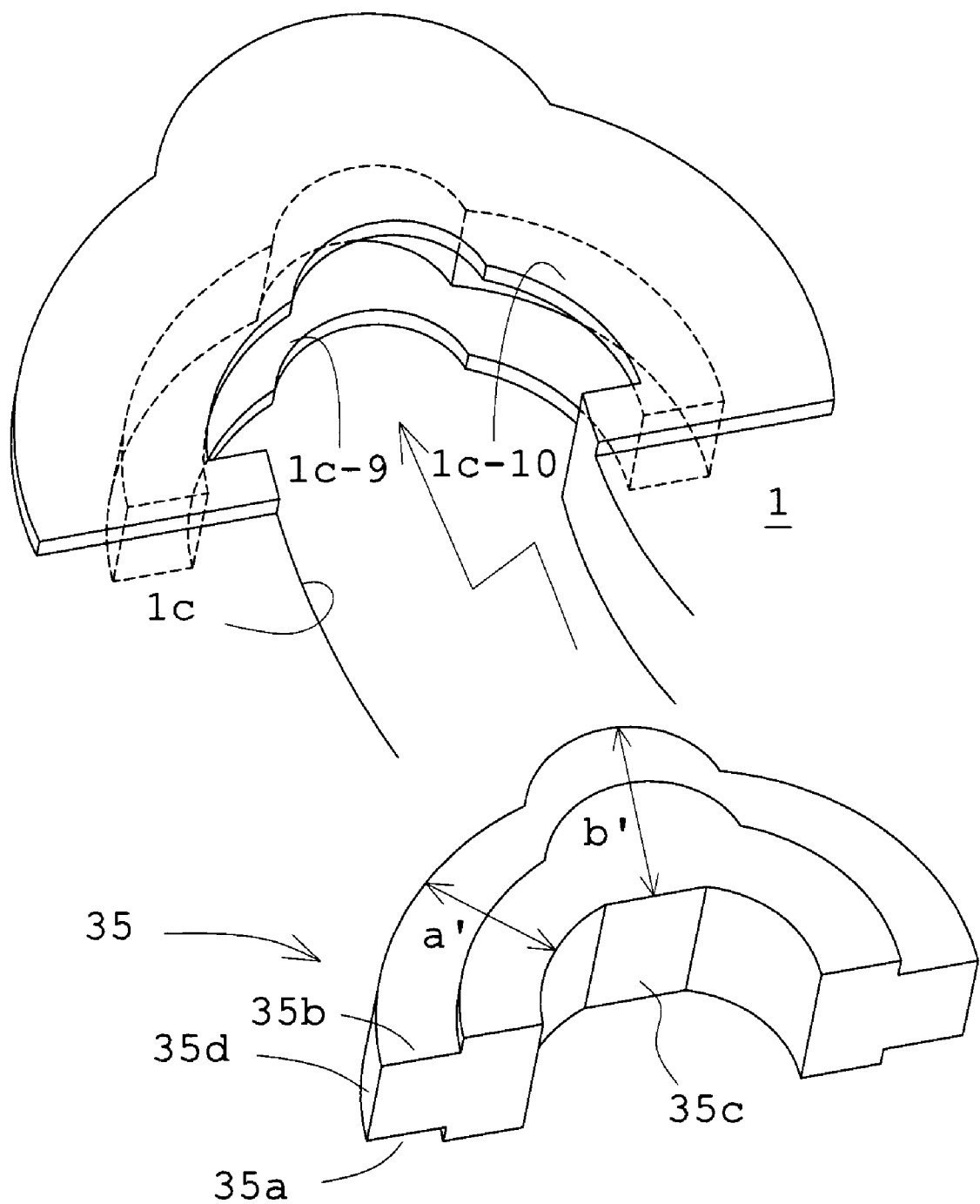
FIG. 10 is a perspective view for explaining a way of mounting the shock absorbing member of Embodiment 3.

Subsequently, Embodiment 3 will be explained, using FIGS. 9 and 10. FIG. 9 is a sectional view showing a mounted state of the shock absorbing member of the embodiment as in FIG. 3, and FIG. 10 is a perspective view for explaining a way of mounting the shock absorbing member of the embodiment, viewed from the upper right of FIG. 9. The shock absorbing members of the embodiment are different in shape from the shock absorbing members 4 and 5 of Embodiment 1. Thus, the shapes of parts configured in the shutter base plate 1 in order to mount the shock absorbing members are also different. However, other features are the same as in Embodiment 1. Hence, in FIGS. 9 and 10, like numerals are used for like members and parts with respect to Embodiment 1 and their explanation is omitted. The description of the operation, which is the same as in Embodiment 1, is also omitted.

As mentioned above, in the embodiment, the shapes of the two shock absorbing members and the structure for mounting them to the shutter base plate 1 are only different from the case of Embodiment 1. The two shock absorbing members are mounted to the shutter base plate 1 in the same way. As such, in FIGS. 9 and 10, only a shock absorbing member 35 on which the driving pin 7a of the second driving member 7 abuts and its mounting structure are shown.

As seen from FIGS. 9 and 10, in the embodiment, one end of the slot 1c in its longitudinal direction is configured not into an arcuate shape, but so that only a part close to the crest of the arcuate shape becomes further arcuate with a small radius of curvature. Along the edge of the end of the slot 1c configured into such a shape, an overhang portion 1c-9 is provided on the blade-chamber-side surface of the shutter base plate 1, while an overhang portion 1c-10 is provided on the blade-chamber-outside surface. Thus, the overhang portions 1c-9 and 1c-10 are also not divided unlike Embodiment 1. Moreover, the overhang portion 1c-9 does not protrude from the blade-chamber-side surface of the shutter base plate 1 into the blade chamber. However, the overhang portion 1c-10, like the overhang portion 1c-8 of Embodiment 2, protrudes from the blade-chamber-outside surface of the shutter base plate 1. The edge of each of the overhang portions 1c-9 and 1c-10 is configured not into an arcuate shape like each of the overhang portions 1c-7 and 1c-8, but so that a part close to the crest of the arcuate shape becomes further arcuate with a small radius of curvature.

As seen from FIG. 10, the shock absorbing member 35 of the embodiment has a planar shape like the letter "C", but its peripheral edge is configured so that a part close to the crest of the arcuate shape becomes further arcuate with a small radius of curvature in agreement with the shape of the end of the slot 1c. The shock absorbing member 35 is configured so that a surface 35c on which the driving pin 7a first abuts is a plane perpendicular to the direction of travel of the driving pin 7a. Consequently, the shock absorbing member 35 of the embodiment is such that a depth dimension b' of a part most compressed by the driving pin 7a becomes larger than a depth dimension a' of the arcuate surface and the dimension a of the shock absorbing member 25 in Embodiment 2 and the braking and shock absorbing effects are further increased.

The shock absorbing member 35, like the shock absorbing member 25 in Embodiment 2, is configured with a concave portion 35a on the blade-chamber-side surface. In the embodiment, however, the shape of the overhang portion 1c-9 is different from that of the overhang portion 1c-7 of Embodiment 2 and hence the shape of the concave portion 35a is also different. In addition, the shock absorbing member 35 is also configured with a concave portion 35b on the blade-chamber-outside surface in agreement with the shape of the overhang portion 1c-10. As such, even in the shock absorbing member 35, a part held between the overhang portions 1c-9 and 1c-10 has small thickness.

The shock absorbing member 35 is deformed as in Embodiment 1 and is inserted between the overhang portions 1c-9 and 1c-10. After a peripheral surface 35d of the shock absorbing member 35 abuts on the inner wall of the slot 1c, the shock absorbing member 35 is restored to the original shape and reaches a mounted state. This mounted state is shown in FIG. 9, and at this time, the shock absorbing member 35 does not protrude from the blade-chamber-side surface of the shutter base plate 1, but protrudes from the blade-chamber-outside surface. Consequently, the shock absorbing member 35 is larger in thickness than the shock absorbing member 25 of Embodiment 2 and therefore, regarded from this point of view, the braking and shock absorbing effects are further increased, as compared with the case of Embodiment 2. Also, although the shock absorbing member 35 is configured with the plane surface 35c, it need not necessarily be provided with the plane surface 35c as in the shock absorbing member 5 of Embodiment 1.

What is claimed is:

1. A focal plane shutter for cameras comprising:
    a shutter base plate made of synthetic resin;
    an auxiliary base plate that at least one blade chamber is constructed together with the shutter base plate between the shutter base plate and the auxiliary base plate;
    at least one shutter blade including a plurality of arms and at least one blade component pivotally supported by the arms, one end of each of which is rotatably mounted to each of a plurality of blade mounting shanks set upright on the shutter base plate;

at least one driving member rotatably mounted to a blade-chamber-outside surface of the shutter base plate and causing the shutter blade to perform an opening and closing operation by a driving pin passing through an arcuate slot configured in the shutter base plate and connected to one of the arms; and a shock absorbing member made from elastic material and mounted to one end of the slot so that the driving pin abuts on the shock absorbing member and thereby a rotation of the driving member is stopped, wherein the shutter base plate is configured with overhang sections on the blade-chamber-outside surface and a blade-chamber-side surface of the shutter base plate at one end of the slot so that the shock absorbing member is held between the overhang sections and the overhang section configured at least on the blade-chamber-side surface of the shutter base plate is provided within a thickness of the shutter base plate.

2. A focal plane shutter for cameras according to claim 1, wherein the shock absorbing member is configured with a concave section along a peripheral edge coming in contact with an inner wall of the slot on at least one of the blade-chamber-side surface and the blade-chamber-outside surface of the shock absorbing member and at least one of the overhang sections comes in contact with the shock absorbing member in the concave section.

3. A focal plane shutter for cameras according to claim 1, wherein the shock absorbing member is configured with a concave section, at least on the blade-chamber-side surface of the shock absorbing member, along a peripheral edge coming in contact with an inner wall of the slot and the overhang sections come in contact with the concave section and the blade-chamber-outside surface of the shock absorbing member to hold a part of the shock absorbing member between the overhang sections.

4. A focal plane shutter for cameras according to claim 1, wherein at least one of the overhang sections is divided into a plurality of overhang portions along one end of the slot.

5. A focal plane shutter for cameras according to claim 4, wherein the shock absorbing member is configured with a plurality of concave portions divided along a peripheral edge coming in contact with an inner wall of the slot on at least one of the blade-chamber-side surface and the blade-chamber-outside surface of the shock absorbing member and the overhang section divided into the plurality of overhang portions comes in contact with the shock absorbing member in the plurality of concave portions.

* * * * *